(12) United States Patent
Maeda et al.

(10) Patent No.: US 10,263,261 B2
(45) Date of Patent: Apr. 16, 2019

(54) ELECTRICALLY CONDUCTIVE INK

(71) Applicant: ZEON CORPORATION, Chiyoda-ku, Tokyo (JP)

(72) Inventors: Kouichirou Maeda, Tokyo (JP); Kenichi Tokuda, Toyota (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 109 days.

(21) Appl. No.: 15/537,430

(22) PCT Filed: Oct. 22, 2015

(86) PCT No.: PCT/JP2015/079832
§ 371 (c)(1),
(2) Date: Jun. 19, 2017

(87) PCT Pub. No.: WO2016/098446
PCT Pub. Date: Jun. 23, 2016

(65) Prior Publication Data
US 2018/0190998 A1    Jul. 5, 2018

(30) Foreign Application Priority Data

Dec. 19, 2014 (JP) .................................. 2014-257767

(51) Int. Cl.
| | |
|---|---|
| *H01M 8/02* | (2016.01) |
| *H01M 8/026* | (2016.01) |
| *C09D 11/52* | (2014.01) |
| *H01M 8/0202* | (2016.01) |
| *C09D 11/037* | (2014.01) |
| *H01M 8/0245* | (2016.01) |

(Continued)

(52) U.S. Cl.
CPC .......... *H01M 8/026* (2013.01); *C09D 11/037* (2013.01); *C09D 11/52* (2013.01); *H01M 8/0202* (2013.01); *H01M 8/0234* (2013.01); *H01M 8/0245* (2013.01); *H01M 8/0254* (2013.01); *H01M 8/1018* (2013.01); *H01M 8/10* (2013.01); *H01M 2008/1095* (2013.01)

(58) Field of Classification Search
CPC .. H01M 8/026; H01M 8/0254; H01M 8/0234; H01M 8/1018; H01M 8/0245; H01M 8/0202; H01M 2008/1095; H01M 8/10; C09D 11/037; C09D 11/52
See application file for complete search history.

(56) References Cited

U.S. PATENT DOCUMENTS

| | | | | |
|---|---|---|---|---|
| 2007/0212589 | A1* | 9/2007 | Kobuchi | H01M 8/0213 |
| | | | | 429/482 |
| 2015/0041729 | A1 | 2/2015 | Maeda | |

FOREIGN PATENT DOCUMENTS

| | | |
|---|---|---|
| JP | 2010129299 A | 6/2010 |
| JP | 2014051060 A | 3/2014 |

(Continued)

*Primary Examiner* — Cynthia K Walls
(74) *Attorney, Agent, or Firm* — Kenja IP Law PC

(57) ABSTRACT

Provided is electrically conductive ink that shows favorable flowability and that can also suppress deformation, such as flattening, upon application of surface pressure.
The electrically conductive ink is applied onto a substrate 21 of a separator 11 that constitutes a cell 13 of a fuel cell stack by way of screen printing so as to form ribs 22 on the substrate 21, wherein the electrically conductive ink has viscoelasticity, as measured by a rotary rheometer, that exhibits a loss tangent of 1 with a strain of 10 to 100%.

3 Claims, 2 Drawing Sheets

(51) Int. Cl.
*H01M 8/1018* (2016.01)
*H01M 8/0234* (2016.01)
*H01M 8/0254* (2016.01)
*H01M 8/10* (2016.01)

(56) References Cited

FOREIGN PATENT DOCUMENTS

| WO | 0103214 A1 | 1/2001 |
| WO | 2013125611 A1 | 8/2013 |
| WO | 2013146720 A1 | 10/2013 |

* cited by examiner

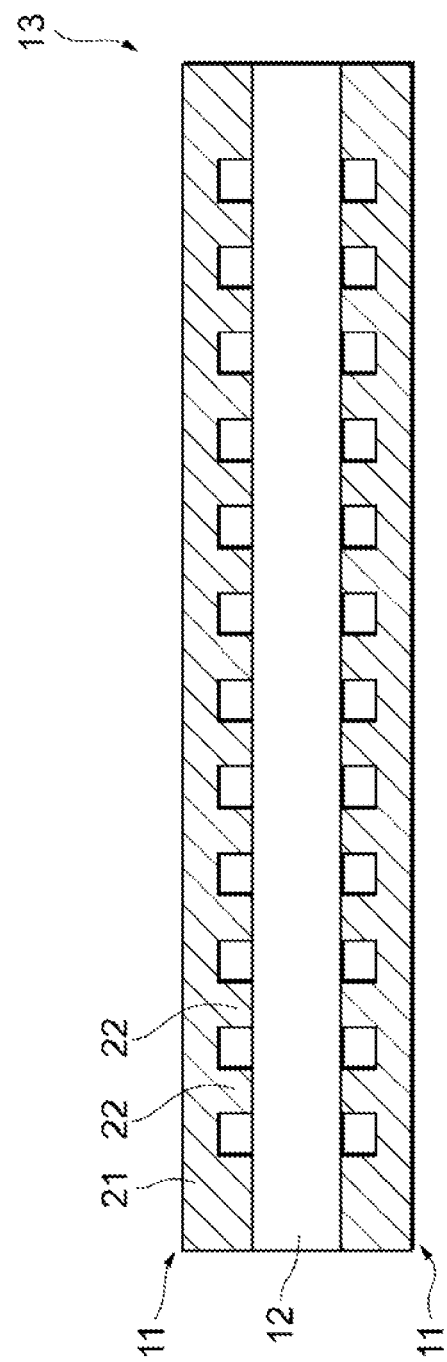

ELECTRICALLY CONDUCTIVE INK

TECHNICAL FIELD

The present invention relates to electrically conductive ink for use in forming ribs on a metal plate substrate by way of screen printing.

BACKGROUND ART

As a technique for forming a gas flow path in a separator that constitutes a fuel cell stack, using a screen printing method to form porous material projections on a surface of the separator substrate is known (see, for example, Patent Document 1).

CITATION LIST

Patent Document

Patent Document 1: JP2010-129299 A

SUMMARY

Technical Problem

When electrically conductive ink is used for such screen printing on a separator substrate, possible deformation, e.g., flattening, of the printed object upon application of surface pressure can be suppressed by increasing the amount of binder contained in the ink. However, the increased amount of binder increases the viscosity of the ink, so that the ink is less flowable during printing. When such electrically conductive ink is used for screen printing to form ribs on the substrate of a separator that constitutes each cell of a fuel cell stack, the resulting ribs may have problems, such as unfavorable shapes of the ribs, defects occurring inside the ribs, and reduced smoothness of the surfaces of the ribs. These problems would lead to an increase in electrical resistance and deterioration of power generation performance.

The present invention has been made in view of the above-described circumstances. An object of the present invention is to provide electrically conductive ink that enables the formation of ribs having a good shape on a substrate of a separator constituting each cell of a fuel cell stack by screen printing, so that electrical resistance values can accordingly be decreased.

Solution to Problem

In order to achieve the above object, the electrically conductive ink according to the present invention is electrically conductive ink which is applied by screen printing onto a substrate of a separator that constitutes a cell of a fuel cell stack so as to form ribs on the substrate with the ink, wherein the electrically conductive ink has viscoelasticity, as measured by a rotary rheometer, that exhibits a loss tangent of 1 with a strain of 10 to 100%.

With the above configuration, the viscoelasticity of the electrically conductive ink, as measured by a rotary rheometer, is defined such that the loss tangent (tan δ) has a value of 1 with a strain of 10 to 100%.

Here, the loss tangent (tan δ) is an index of the viscoelasticity of the ink, and is defined as a ratio of loss modulus (G") to storage modulus (G') (G"/G'=tan δ). The loss tangent (tan δ) and strain have a relationship as shown in FIG. 1.

In electrically conductive ink used for screen printing on the substrate of a separator, a specific amount of binder is added to increase the viscosity of the ink, so as to suppress deformation, such as flattening, upon application of surface pressure and to thereby form ribs having a dense structure. However, when the viscosity is increased too high, the ink tends to be less flowable during the screen printing. In other words, the flowability of the electrically conductive ink is greatly affected by the viscoelasticity of the ink. In this regard, in order for the electrically conductive ink to have favorable flowability, the ink needs to have a viscoelastic behavior showing a loss tangent of 1 with a strain of 10 to 100%, as shown in FIG. 1.

The electrically conductive ink having the above-mentioned configuration has viscoelasticity, as measured by a rotary rheometer, that exhibits a loss tangent (tan δ) of 1 with a strain of 10 to 100%, as described above, and thus, when ribs are formed with this ink on the separator substrate by screen printing, the ribs have a dense structure due to the contraction of the binder during drying so that deformation upon application of surface pressure can be suppressed. In addition to the above, the electrically conductive ink, though it includes a certain amount of binder, exhibits favorable flowability during the screen printing. Thus, the electrically conductive ink is suited for use in forming ribs on a separator to accordingly make a flow path of a fuel cell stack.

The electrically conductive ink of the present invention preferably has a shear viscosity, measured at a shear rate of 1 (1/s), of 80 to 150 mPa·s, and has a shear viscosity, measured at a shear rate of 10 (1/s), of 20 to 60 mPa·s.

Further, the electrically conductive ink of the present invention is preferably water-based electrically conductive ink including, based on 100 parts by weight of an electrically conductive material, 1 to 20 parts by weight of a viscosity adjusting agent, 1 to 10 parts by weight of a binder, 30 to 100 parts by weight of water, and 20 to 50 parts by weight of a fluidity adjusting agent, wherein the solid content is 50 to 65 wt %, the water content is 20 to 30 wt %, and the fluidity adjusting agent is 10 to 25 wt %.

Advantageous Effects of Invention

The present invention enables the provision of electrically conductive ink which exhibits favorable flowability and which can also suppress deformation, such as flattening, upon application of surface pressure.

BRIEF DESCRIPTION OF DRAWINGS

FIG. 2 is a schematic sectional view of a cell having a separator provided with ribs which are formed using electrically conductive ink according to the present embodiment.

DESCRIPTION OF EMBODIMENTS

Figure 1:
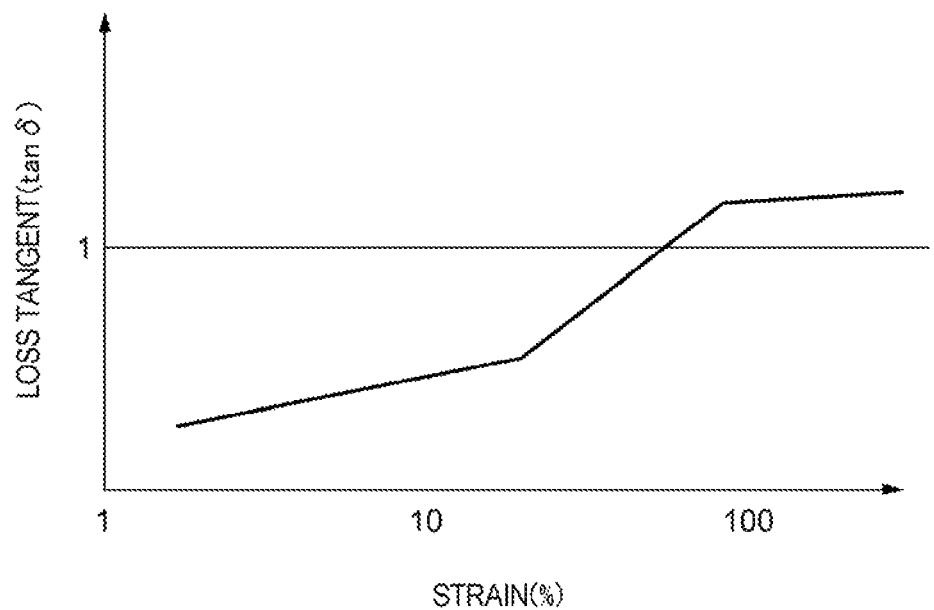
FIG. 1 is a graph showing the relationship between a strain and a loss tangent.

Hereinafter, embodiments of the electrically conductive ink according to the present invention will be described.

Electrically conductive ink according to the present embodiment is for use in, for example, producing a separator for a cell constituting a polymer electrolyte fuel cell. The electrically conductive ink is applied onto a metal plate substrate of the separator by way of screen printing so as form ribs on the substrate. Such electrically conductive ink has viscoelasticity, as measured by a rotary rheometer, exhibiting a loss tangent of 1 at a strain of 10 to 100%, preferably at a strain of 30 to 80%. With the viscoelasticity falling within the above range, excellent screen printing performance and decreased electrical resistance can be obtained.

By using such electrically conductive ink of the present embodiment for screen printing onto the substrate of the separator, ribs having a width of 0.1 to 2 mm and a height of 0.1 to 3 mm can be formed on the substrate. The electrically conductive ink is configured to contain a carbon-based electrically conductive material and have a solid concentration of 50 to 58 wt %. The carbon-based electrically conductive material is a mixture of two or more types of carbon-based electrically conductive materials, including 60 to 95 parts by weight of a carbon-based material having an average particle size of 10 to 100 μm, and 5 to 40 parts by weight of a carbon-based material having an average particle size of 0.1 to 8 μm.

The electrically conductive ink according to the present embodiment is water-based electrically conductive ink, and it includes: 1 to 20 parts by weight, preferably 2 to 10 parts by weight, of a viscosity adjusting agent; 1 to 10 parts by weight, preferably 2 to 7 parts by weight, of a binder; 30 to 100 parts by weight, preferably 40 to 70 parts by weight, of water; and 20 to 50 parts by weight, preferably 30 to 40 parts by weight, of a fluidity adjusting agent, based on 100 parts by weight of the electrically conductive material, wherein the solid content thereof is 50 to 65 wt %, preferably 53 to 60 wt %, the water content is 20 to 30 wt %, preferably 23 to 28 wt %, and the fluidity adjusting agent is 10 to 25 wt %, preferably 15 to 20 wt %.

As used herein, the term "solid content" means residual components after the drying of the electrically conductive ink.

Next, the composition of the electrically conductive ink according to the present embodiment will be more specifically described.

(Electrically Conductive Material)

The electrically conductive material used for the electrically conductive ink according to the present embodiment may be, for example, carbon. Examples of such carbon that can be used include: graphite, such as flake graphite, artificial graphite and spheroidal graphite; carbon black, which is in the form of spherical aggregates in which a turbostratic structure is formed from several layers of graphite carbon microcrystals (specific examples include acetylene black, Ketjenblack and other kinds of furnace black, channel black and thermal lamp black); carbon fiber; and carbon whisker, and it is preferable to use graphite and carbon black in combination.

Densely packed carbon can be obtained by using carbon black graphite having a relatively large particle size, i.e., tens of micrometers, and graphite carbon black having a relatively small particle size, i.e., several micrometers, in combination.

(Viscosity Adjusting Agent)

It is necessary to use a viscosity adjusting agent for the electrically conductive ink according to the present embodiment. Water-soluble polymers are used for the viscosity adjusting agent and, in particular, polyvinyl alcohol is suitable for the viscosity adjusting agent. With the use of polyvinyl alcohol, the resulting electrically conductive ink can impart improved acid resistance to the ribs formed on the separator substrate with the ink, and furthermore, the dispersibility of the electrically conductive material can be improved.

The weight average molecular weight (Mw) of the polyvinyl alcohol is preferably 50,000 to 500,000. When the weight average molecular weight (Mw) of the polyvinyl alcohol is excessively small, the viscosity of the resulting electrically conductive ink decreases, and when the weight average molecular weight (Mw) of the polyvinyl alcohol is excessively large, the viscosity increases, which makes it difficult to obtain uniformly viscous electrically conductive ink.

The degree of saponification of the polyvinyl alcohol is 95% or more, preferably 98% or more. When the degree of saponification of the polyvinyl alcohol is excessively low, the resulting electrically conductive ink is unable to impart sufficient acid resistance to the ribs formed on the separator substrate with the ink.

The polyvinyl alcohol has a viscosity, as measured in a 4 wt % aqueous solution at 20° C., of 3 to 70 mPa·s, preferably 4 to 50 mPa·s, and more preferably 5 to 45 mPa·s.

(Binder)

An acrylic binder is used for the electrically conductive ink according to the present embodiment. Suitable examples of the acrylic binder that can be used include acid-modified polyacrylates and nitrile-modified polyacrylates. Examples of the acid-modified polyacrylates include copolymers of acid monomers and acrylate monomers, and examples of the nitrile-modified polyacrylates include copolymers of acrylonitrile monomers and acrylate monomers. Copolymers obtained by the copolymerization of acrylate monomers with acid monomers and acrylonitrile monomers may also be used. The proportion of the acid monomer units contained in the acid-modified polyacrylate is preferably 0.1 to 10 parts by weight, and more preferably 1 to 8 parts by weight. With the proportion of the acid monomer units within the above range, particularly excellent screen printing performance can be obtained.

Examples of the acid monomer include acrylic acid and methacrylic acid. Examples of the acrylate monomer include ethyl acrylate, butyl acrylate, 2-ethylhexyl acrylate (2EHA), and isononyl acrylate. It should be noted here that the "acrylate" mentioned above also includes methacrylate (the same will apply hereinafter). The proportion of the acrylonitrile monomer units contained in the nitrile-modified polyacrylate is preferably 0.1 to 10 parts by weight, and more preferably 1 to 8 parts by weight. With the proportion of the acrylonitrile monomer units within the above range, particularly excellent screen printing performance can be obtained. Examples of the acrylonitrile monomer include acrylonitrile, methacrylonitrile, and crotononitrile.

The amount of acrylate monomers used in the copolymerization for the acrylic binder polymer is typically 50 to 95 parts by weight, preferably 65 to 90 parts by weight, and more preferably 70 to 85 parts by weight, based on the total amount (100 parts by weight) of monomers. When the amount of acrylate monomers is excessively small, the resulting ribs formed of a conductive coating film are susceptible to breakage. When the amount of acrylate monomers is excessively large, the peeling strength of the resulting ribs formed of a conductive coating film decreases. With the amount of acrylate monomers within the range mentioned above, further excellent screen printing performance can be obtained and the resistance value can be further decreased.

Acid-modified polyacrylates and/or nitrile-modified polyacrylates can be obtained by a known polymerization method. For example, a binder polymer can be obtained by adding acrylic acid and/or acrylonitrile, acrylate monomers, and seed latex to water, stirring the resulting mixture and then increasing the temperature thereof to a predetermined temperature, adding a polymerization initiator, such as an aqueous potassium persulfate solution, thereto in order to initiate polymerization reaction, continuing the polymerization reaction so as to have a predetermined polymerization rate, then cooling the reaction solution to remove unreacted monomers, and thereafter adjusting the resulting product to have a predetermined solid concentration and pH.

The polymerization initiator is not particularly limited, and specific examples thereof include an inorganic peroxide, an organic peroxide, and an azo compound. Examples of the inorganic peroxide include sodium persulfate, potassium persulfate, ammonium persulfate, potassium perphosphate, and hydrogen peroxide. Examples of the organic peroxide include diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide. Examples of the azo compound include azo compounds, such as azobisisobutyronitrile, azobis-2,4-dimethylvaleronitrile, and azobis methyl isobutyrate.

Of these, persulfate, such as potassium persulfate or ammonium persulfate, is preferable for the polymerization initiator. These polymerization initiators can be each used alone, or in combination of two or more. The amount of the polymerization initiator used is, although it depends on the type thereof, preferably 0.01 to 5 parts by weight, and more preferably 0.05 to 1 parts by weight, based on the total amount (100 parts by weight) of acrylic acid and/or acrylonitrile and acrylate monomers.

A surfactant, etc., may also be added as required in the polymerization reaction for the binder polymer. Examples of the surfactant include anionic surfactants such as sodium dodecylbenzenesulfonate and ammonium lauryl sulfate.

(Fluidity Adjusting Agent)

In addition to the electrically conductive material and polyvinyl alcohol, a high boiling point alcohol is preferably used as a fluidity adjusting agent, from the viewpoint of facilitating the adjustment of the viscoelastic properties of the electrically conductive ink according to the present embodiment and controlling the rate of drying so as to form a flat and smooth coating film. The proportion of the fluidity adjusting agent contained in the electrically conductive ink is preferably 10 to 25 wt %, and more preferably 15 to 20 wt %.

The boiling point of such high boiling point alcohol is preferably 110 to 300° C., and more preferably 130 to 200° C. With the boiling point falling within the above range, the rate of drying can be controlled during the process of forming ribs on the separator substrate, a flat and smooth coating film can be obtained, and the migration of the electrically conductive material or the binder can be prevented. When the high boiling point alcohol has a boiling point of 110° C. or higher, the migration of the binder can easily be suppressed. Meanwhile, when the boiling point is lower than 300° C., the ink can easily be dried after printing. Examples of such high boiling point alcohol include glycerin, glycols (such as ethylene glycol, diethylene glycol, polyethylene glycol, propylene glycol, dipropylene glycol, and polypropylene glycol), and cellosolves (such as glycols, ethyl cellosolve, and butyl cellosolve). Of these, glycols are used preferably, and the combined use of glycols and alcohols is more preferable. The ratio of glycols and alcohols (glycols/alcohols) is preferably 60/40 to 98/2, more preferably 70/30 to 95/5, and still more preferably 80/20 to 90/10, on a weight basis.

(Other Components)

Additives may further be added, as required, to the electrically conductive ink according to the present embodiment. Examples of such additives include silicon-based or fluorine-based defoaming agents.

FIG. 2 is a schematic sectional view of a cell having a separator with ribs formed using electrically conductive ink according to the present embodiment.

As illustrated in FIG. 2, each separator 11 constitutes a cell 13 together with a membrane electrode assembly (MEA) 12. A plurality of such cells 13 is stacked to form a fuel cell stack. The cell 13 is a unit module for electricity generation in the fuel cell stack, and electricity is generated through the electrochemical reaction between oxygen included in the air and hydrogen gas.

The separators 11 hold the membrane electrode assembly 12 therebetween. The membrane electrode assembly 12 is comprised of an electrolyte membrane and electrodes, each including a catalyst layer and a diffusion layer, disposed on both sides of the electrolyte membrane. Each separator 11 has a substrate 21 which is a plate of metal, e.g., SUS (stainless steel), and a plurality of ribs 22. The ribs 22 are arranged on the surface of the substrate 21 with a space therebetween. The gap defined by the space between the ribs 22 serves as a flow path for the fuel gas and the air. It should be noted here that, in practice, the separator 11 has ribs 22 on both sides thereof so that a membrane electrode assembly 12 is held on each side of the separator 11, but the illustration thereof is omitted in the drawing.

The electrically conductive ink according to the present embodiment is applied to the substrate 21 by way of screen printing, and the applied ink is then heated and cured to form ribs 22.

As described above, the electrically conductive ink according to the present embodiment which is used to form the ribs 22 of the separator 11 has viscoelasticity, as measured by a rotary rheometer, exhibiting a loss tangent (tan δ) of 1 with a strain of 10 to 100%.

Here, when using electrically conductive ink for screen printing on the metal plate substrate 21, a specific amount of binder is added to the ink so as to increase the viscosity of the ink and to thereby enable dense ribs 22 to be formed by suppressing deformation, e.g., flattening, upon application of surface pressure. However, an excessive increase in viscosity tends to make the ink less flowable during the screen printing. In other words, the flowability of the electrically conductive ink is greatly affected by the viscoelasticity of the ink. In this regard, in order for the electrically conductive ink to exhibit favorable flowability, the ink needs to exhibit viscoelastic behavior showing a loss tangent of 1 with a strain of 10 to 100%.

The electrically conductive ink according to the present embodiment has viscoelasticity, as measured by a rotary rheometer, that exhibits a loss tangent (tan δ) of 1 with a strain of 10 to 100%. As a result, when the ink is applied onto the metal-plate formed substrate 21 by screen printing to form ribs 22, the ribs 22 have a dense structure due to the contraction of the binder during drying so that deformation upon application of surface pressure can be suppressed. Moreover, the ink can show favorable flowability during screen printing even though it includes a specific amount of binder. Thus, such electrically conductive ink according to the present embodiment can suitably be used for forming ribs 22 on the substrate 21 of the separator 11 to provide a flow path in the fuel cell stack. The electrically conductive ink preferably has a shear viscosity, measured at a shear rate of 1 (1/s), of 80 to 150 mPa·s, more preferably 90 to 140 mPa·s, and still more preferably 100 to 130 mPa·s. At a shear rate of 10 (1/s), the shear viscosity of the electrically conductive ink is preferably 20 to 60 mPa·s, more preferably 25 to 50 mPa·s, and still more preferably 30 to 40 mPa·s. With the shear viscosity within the above range, further excellent screen printing performance can be obtained.

Furthermore, with the use of the electrically conductive ink according to the present embodiment, porous ribs 22 that can endure the application of surface pressure can be formed and, as a result, undesirable conditions in power generation, such as unstable power generation arising from the change in porosity due to the surface pressure, can be suppressed.

EXAMPLES

The present invention will now be described in more detail by using Examples 1, 2, 3 and 4 and Comparative Examples 1 and 2 below. The present invention is, however, not limited to Examples 1, 2, 3 and 4. Unless otherwise specified, "parts" and "%" in Examples 1, 2, 3 and 4 and Comparative Examples 1 and 2 are described on a mass basis.

In each of Examples 1, 2, 3 and 4 and Comparative Examples 1 and 2, the measurement of various properties, the screen printing, the measurement of rib shapes, the calculation of resistance values, and the production of binder compositions and electrically conductive ink were performed according to the methods set out below.

(Viscoelasticity)

The storage modulus, loss modulus, and loss tangent were measured using a rheometer "MCR302" manufactured by Anton Paar, at a temperature of 23° C., with a rotor gap of 1 mm, and at varying strains of from 0.01% to 100%.

(Viscosity)

The shear viscosity was measured using a rheometer manufactured by Anton Paar, at a temperature of 23° C., with a rotor gap of 1 mm, and at varying shear rates of from 0.1 (1/s) to 100 (1/s).

(Screen Printing)

A substrate made of an SUS (stainless steel) plate having a thickness of 0.25 mm was used together with a screen (stencil) having 10 rectangular openings, each being 1 mm wide and 20 mm long and formed at 2 mm internals. After printing, the substrate was heated at 80° C. for ten minutes to obtain a separator having ribs.

(Measurement of Rib Shapes)

As for the rib sizes, the shapes (heights and widths) of the ribs were measured using a laser microscope (a shape measuring laser microscope VK-8710, manufactured by Keyence Corporation). Each opening of the screen had a sectional area of 0.25 mm×1 mm, and the ratio of the sectional area of the ribs formed by printing to the cross-sectional area of the openings was calculated and regarded as a shaping property in printing.

(Calculation of Resistance Values)

Commercially available electrically conductive unwoven cloth was placed as a gas diffusion layer on a test piece prepared by screen printing, and SUS (stainless steel) plates were further placed so as to sandwich the test piece and the cloth. For the resulting test piece, a resistance value between the upper layer SUS (stainless steel) plate and the lower layer SUS (stainless steel) plate was measured, and a resistance value per unit area was calculated based on the area of the printed ribs. The resistance value was measured three times, to obtain the average thereof. The measurement of the resistance values was performed using a "CD700 Digital Multimeter" manufactured by Sanwa Electric Instrument Co., Ltd. A lower resistance value is considered favorable since it indicates better power generation performance of the cell.

(Production of Binder Composition)

Added to a stainless steel pressure reactor equipped with a stirrer, and then stirred, were 3 parts (in terms of solid content) of seed latex (latex of polymer particles having a particle size of 70 mm, obtained by polymerizing 38 parts of styrene, 60 parts of methyl methacrylate, and 2 parts of methacrylic acid), 60 parts of 2-ethylhexyl acrylate, 40 parts of butyl acrylate, 2 parts of ammonium lauryl sulfate (anionic surfactant), and 108 parts of ion exchange water. Subsequently, the internal temperature of the reactor was increased to 60° C., and 10 parts of a 4% aqueous potassium persulfate solution were then added so as to initiate polymerization reaction. When the polymerization reaction progressed and the polymerization rate reached 70%, the reaction temperature was increased to 70° C. While maintaining the reaction temperature at 70° C., the polymerization reaction was allowed to continue until the polymerization rate reached 97%. The temperature of the reaction system was then lowered to room temperature to stop the polymerization reaction, and unreacted monomers were removed under reduced pressure. Ion exchange water was then added and the solid concentration and pH of the resulting dispersion were adjusted to 40% and 7.5, respectively, to thereby obtain a dispersion of a binder polymer. The pH adjustment of the dispersion was performed by the addition of a 10% aqueous solution of ammonia. The obtained binder polymer particles had a volume average particle size of 0.35 μm.

(Production of Electrically Conductive Ink)

Carbon and propylene glycol were kneaded in a batch-type kneader for 30 minutes. The dispersion of the binder polymer obtained above and water were further added to the resulting mixture, and the mixture was then kneaded in the same batch-type kneader for 30 minutes to prepare electrically conductive ink.

The graphite and carbon black used in Examples 1, 2, 3 and 4 were as follows:

Graphite: Artificial Graphite AT-10, manufactured by Oriental Industry Co., Ltd.

Carbon black: Denka Black, manufactured by Denki Kagaku Kogyo Kabushiki Kaisha

Table 1 shows the composition of the electrically conductive ink and the results of the physical property measurements in each of Examples 1, 2, 3 and 4 and Comparative Examples 1 and 2.

TABLE 1

| | | | Example 1 | Example 2 | Example 3 | Example 4 | Comparative Example 1 | Comparative Example 2 |
|---|---|---|---|---|---|---|---|---|
| Composition of electrically conductive ink | Electrically conductive material | Graphite | 85 | 85 | 85 | 85 | 85 | 88 |
| | | Carbon black | 15 | 15 | 15 | 15 | 15 | 12 |

TABLE 1-continued

|  |  |  | Example 1 | Example 2 | Example 3 | Example 4 | Comparative Example 1 | Comparative Example 2 |
|---|---|---|---|---|---|---|---|---|
| (part by weight) | Viscosity adjusting agent | PVOH (solid content) | 5 | 5 | 5 | 5 | 5 | 5 |
|  | Binder | Solid content | 3 | 3 | 3 | 3 | 3 | 3 |
|  | Water |  | 49.5 | 49.5 | 49.5 | 52 | 49.5 | 55 |
|  | Fluidity adjusting agent | Dipropylene glycol | 30 | 20 | 25 | 30 | 20 | 0 |
|  |  | 2-(2-ethoxyethoxy)ethanol | 5 | 5 | 5 | 0 | 5 | 45 |
|  |  | Triethylene glycol | 0 | 10 | 5 | 5 | 0 | 10 |
|  |  | Solid concentration | 56.1% | 56.1% | 56.1% | 55.4% | 59.2% | 49.5% |
| Shear viscosity (mPa·s) | Shear rate | 1 (1/s) | 120 | 115 | 133 | 98 | 135 | 356 |
|  |  | 10 (1/s) | 35 | 38 | 42 | 22 | 40 | 145 |
| Viscoelasticity |  | Strain (%) at loss tangent of 1 | 65 | 55 | 22 | 87 | 3.5 | 230 |
| Printing performance |  | Shaping property (%) | 90 | 85 | 80 | 92 | 60 | 35 |
| Resistance value |  | Ωcm | 12 | 16 | 20 | 18 | 25 | 126 |

As can be seen from Table 1, the electrically conductive ink of Example 1 showed a loss tangent of 1 at a strain of 65%, the electrically conductive ink of Example 2 showed a loss tangent of 1 at a strain of 55%, the electrically conductive ink of Example 3 showed a loss tangent of 1 at a strain of 22%, and the electrically conductive ink of Example 4 showed a loss tangent of 1 at a strain of 87%. In contrast, the electrically conductive ink of Comparative Example 1 showed a loss tangent of 1 at a strain of 3.5% and the electrically conductive ink of Comparative Example 2 showed a loss tangent of 1 at a strain of 230%.

All of Examples 1, 2, 3 and 4 showed a loss tangent of 1 at a strain of 10 to 100%. Accordingly, when such electrically conductive ink of Examples 1, 2, 3 and 4 is used to form ribs on a metal plate substrate by screen printing, the resulting ribs will have a dense structure due to the contraction of the binder during drying, so that deformation upon application of surface pressure can be suppressed, and furthermore, favorable flowability can be achieved during screen printing, despite the inclusion of a certain amount of binder in the ink.

REFERENCE SIGNS LIST

11 Separator
13 Cell
21 Substrate
22 Rib

What is claimed is:

1. Electrically conductive ink applied onto a substrate of a separator that constitutes a cell of a fuel cell stack by way of screen printing so as to form ribs on the substrate, wherein the electrically conductive ink has viscoelasticity, as measured by a rotary rheometer, that exhibits a loss tangent of 1 with a strain of 10 to 100%.

2. The electrically conductive ink according to claim 1, which has a shear viscosity measured at a shear rate of 1 (1/s) of 80 to 150 mPa·s, and has a shear viscosity measured at a shear rate of 10 (1/s) of 20 to 60 mPa·s.

3. The electrically conductive ink according to claim 1, being water-based electrically conductive ink comprising 1 to 20 parts by weight of a viscosity adjusting agent, 1 to 10 parts by weight of a binder, 30 to 100 parts by weight of water, and 20 to 50 parts by weight of a fluidity adjusting agent, based on 100 parts by weight of an electrically conductive material, wherein a solid content is 50 to 65 wt %, a water content is 20 to 30 wt % and the fluidity adjusting agent is 10 to 25 wt %.

* * * * *